US010237257B2

(12) United States Patent
Stites et al.

(10) Patent No.: US 10,237,257 B2
(45) Date of Patent: Mar. 19, 2019

(54) NETWORK SERVICE HEADER USED TO RELAY AUTHENTICATED SESSION INFORMATION

(71) Applicant: Cisco Technology, Inc., San Jose, CA (US)

(72) Inventors: Steven Stites, Austin, TX (US); Prashanth Patil, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 57 days.

(21) Appl. No.: 15/014,724

(22) Filed: Feb. 3, 2016

(65) Prior Publication Data

US 2017/0222998 A1 Aug. 3, 2017

(51) Int. Cl.
*H04L 29/06* (2006.01)
*H04L 29/08* (2006.01)
*H04W 12/06* (2009.01)

(52) U.S. Cl.
CPC .......... *H04L 63/08* (2013.01); *H04L 63/0884* (2013.01); *H04L 63/162* (2013.01); *H04L 63/164* (2013.01); *H04L 67/141* (2013.01); *H04L 69/22* (2013.01); *H04W 12/06* (2013.01)

(58) Field of Classification Search
CPC ....... H04L 63/08; H04L 63/884; H04L 12/06; H04L 69/22
USPC .......................................................... 726/3
See application file for complete search history.

(56) References Cited

U.S. PATENT DOCUMENTS

| | | | |
|---|---|---|---|
| 6,681,232 B1 | 1/2004 | Sistanizadeh | 709/224 |
| 6,738,354 B1 | 5/2004 | Ashwood Smith | 370/248 |
| 8,176,201 B1 | 5/2012 | Minei | 370/231 |
| 8,824,274 B1 | 9/2014 | Medved | 370/217 |
| 8,891,553 B2 | 11/2014 | Guichard | 370/392 |
| 9,686,167 B2 | 6/2017 | Dunbar | |
| 2002/0156914 A1 | 10/2002 | Lo | 709/238 |
| 2004/0151159 A1 | 8/2004 | Xu | 370/351 |
| 2005/0236113 A1 | 10/2005 | Tani | 156/558 |
| 2005/0240610 A1 | 10/2005 | Tani | 707/101 |
| 2006/0130126 A1* | 6/2006 | Touve | H04L 63/0815 726/5 |
| 2007/0053359 A1 | 3/2007 | Wu | 370/392 |
| 2009/0067423 A1 | 3/2009 | Visser | 370/389 |

(Continued)

OTHER PUBLICATIONS

S. Lee, S. Yoon and M. Kim, "Research on automatic header-signature naming system for Internet service identification," 2015 17th Asia-Pacific Network Operations and Management Symposium (APNOMS), Busan, 2015, pp. 428-431. doi: 10.1109/APNOMS.2015.7275376 (Year: 2015).*

(Continued)

*Primary Examiner* — Alexander Lagor
*Assistant Examiner* — Vu V Tran
(74) *Attorney, Agent, or Firm* — Campbell Stephenson LLP

(57) ABSTRACT

In one embodiment, a system, method, and computer program product are disclosed for authenticating a packet received from a client node, storing the results of the authentication in a cache memory of a service classifier node, and including the results of the authentication in a network service header of a packet before forwarding the packet to downstream service nodes. In one embodiment, the initial authentication is performed in conjunction with an authentication node.

18 Claims, 9 Drawing Sheets

(56) References Cited

U.S. PATENT DOCUMENTS

| | | | |
|---|---|---|---|
| 2009/0077237 A1 | 3/2009 | Brehon | 709/226 |
| 2009/0190494 A1 | 7/2009 | De Giovanni | 370/254 |
| 2010/0135300 A1* | 6/2010 | Yoon | H04L 45/306 370/392 |
| 2012/0308225 A1 | 12/2012 | Long | 398/13 |
| 2013/0111549 A1* | 5/2013 | Sowatskey | H04L 63/08 726/3 |
| 2014/0177638 A1 | 6/2014 | Bragg | 370/395.5 |
| 2015/0003283 A1 | 1/2015 | Previdi | 370/254 |
| 2015/0003455 A1* | 1/2015 | Haddad | H04L 45/38 370/392 |
| 2015/0081855 A1* | 3/2015 | Zhang | H04L 41/12 709/220 |
| 2016/0134481 A1 | 5/2016 | Akiya et al. | 709/224 |

OTHER PUBLICATIONS

P. Quinn and J. Guichard, "Service Function Chaining: Creating a Service Plane via Network Service Headers," in Computer, vol. 47, No. 11, pp. 38-44, Nov. 2014. (Year: 2014).*

Aldrin, S. et al., "Service Function Chaining Operations, Administration, and Maintenance Framework"; draft-aldrin-sfc-oam-framework-00; Internet Engineering Task Force; Internet-Draft; Jul. 2, 2014; pp. 1-11.

Halpern, J., et al., "Service Function Chaining (SFC) Architecture"; draft-merged-sfc-architecutre-02; Network Working Group; Internet-Draft; Intended Status: Standards Track; Aug. 22, 2014; pp. 1-26.

Halpern, J., et al., Service Function Chaining (SFC) Architecture; Internet Engineering Task Force (IETF); Request for Comments 7665; Category: Informational; ISSN: 2070-1721; Oct. 2015; pp. 1-32.

Kompella, K., Detecting Multi-Protocol Label Switched (MPLS) Data Plane Failures, Network Working Group; Request for Comments: 4379; Updates: 1122; Category: Standards Track; Feb. 2006; pp. 1-50.

Quinn, P. et al.; "Network Service Header"; draft-quinn-sfc-nsh-03. txt; Network Working Group; Internet—Draft; Intended Status: Standards Track; Jul. 3, 2014; pp. 1-27.

Quinn, P. et al., "Network Service Header"; draft-quinn-sfc-nsh-07. txt; Network Working Group; Internet-Draft; Intended Status: Standards Track; Feb. 24, 2015; pp. 1-43.

Quinn, P. et al., "Network Service Header"; draft-quinn-sfc-nsh-01. txt; Network Working Group; Internet-Draft; Intended Status: Standards Track; Jul. 23, 2015; pp. 1-43.

* cited by examiner

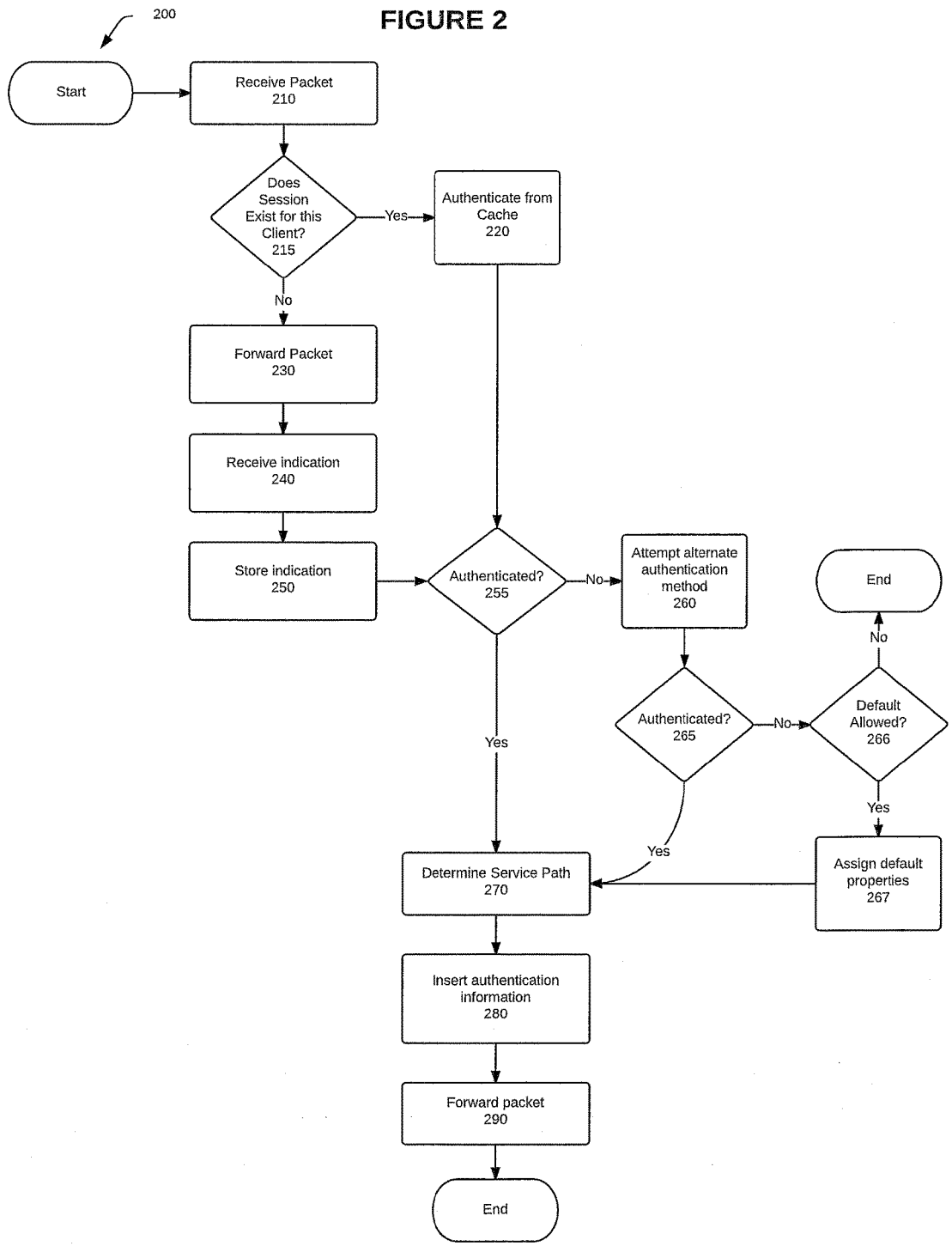

NETWORK SERVICE HEADER USED TO RELAY AUTHENTICATED SESSION INFORMATION

FIELD OF THE INVENTION

This disclosure generally relates to the field of networking, and more specifically to the authentication of packets and traffic at the service topology layer of a network.

BACKGROUND OF THE INVENTION

Applications that use hypertext transfer protocol ("HTTP") often use the concept of session cookies to maintain an authentication assert of a particular user, or client. In HTTP, sessions are maintained by sending a named token in an HTTP header that can be used by the application server to look up or validate the identity of the requestor of the transaction. Such a model works well with Layer 7 ("L7") applications, where the requestor or client can easily add tokens to the application protocol. However, current methods do not work with respect to service function chains in Layer 2 ("L2") and Layer 3 ("L3") oriented services, such as in the service topology layer of a network.

BRIEF DESCRIPTION OF THE DRAWINGS

Embodiments such as those described herein may be better understood, and its numerous objects, features and advantages made apparent to those skilled in the art by referencing the accompanying drawings.

FIG. 2 is a flowchart that illustrates actions that can be performed by a service function classifier to authenticate a packet and perform other functionality, according to one embodiment.

DETAILED DESCRIPTION

Overview

Figure 1A:
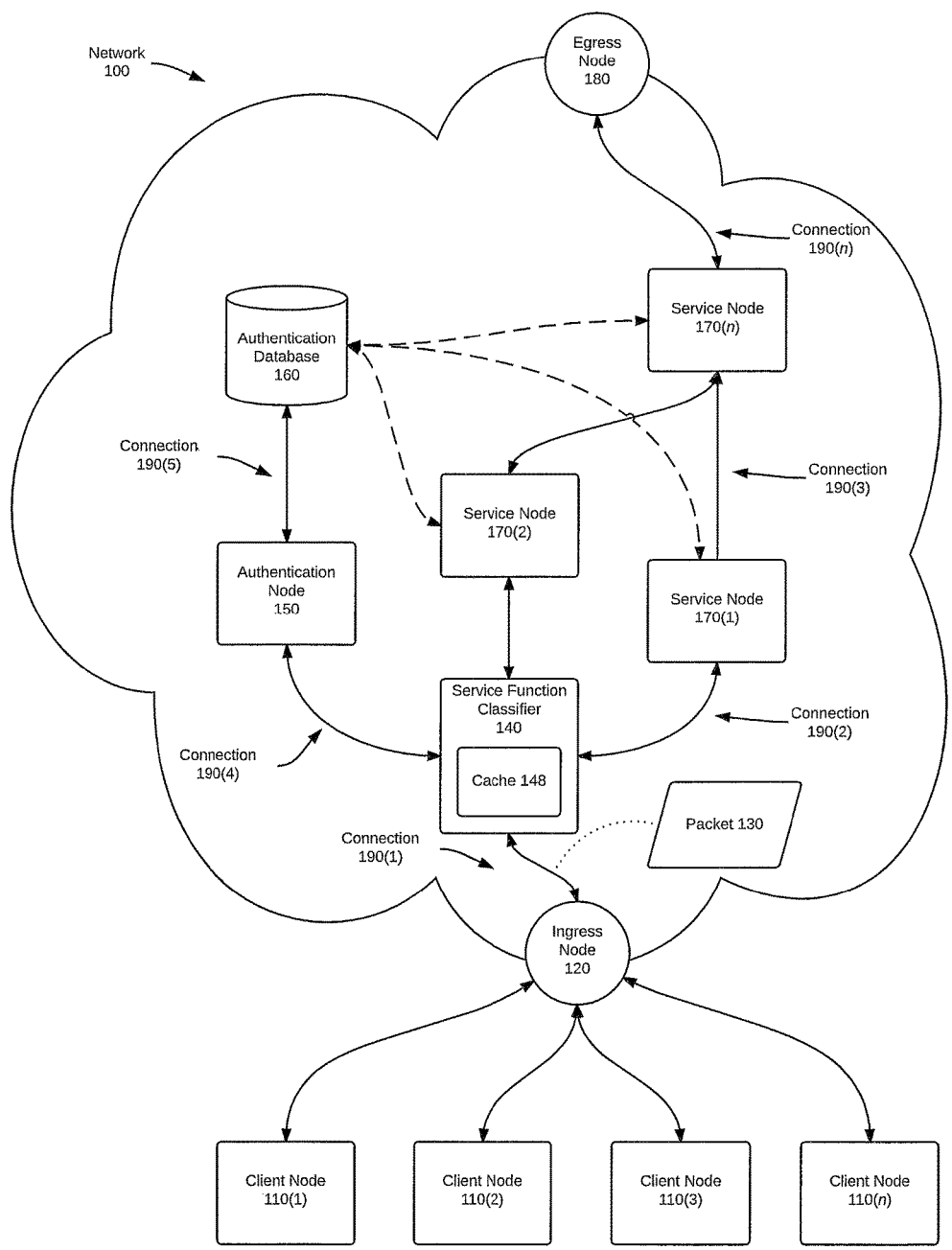
FIG. 1A is a block diagram of a service topology layer of a network, including various nodes, a service function classifier, an authentication node, and service nodes, and related items, according to one embodiment.

Disclosed herein are various systems and methods for authenticating a packet or a series of packets on a service topology layer of a network, according to one embodiment of this disclosure. For example, when a packet or series of packets ("traffic") enters the service topology layer of a network, a node (such as, e.g., a service function classifier) can set the appropriate service path for that traffic. This service path can be selected, at least in part, based on whether the user node or client node (collectively, "client") sending the traffic has been identified and has an existing authenticated session with the service function classifier. If the client has not been identified and does not have an existing session, the service function classifier forwards flows to an authentication node to authenticate the client, and by extension, other flows received from that client. Once the client has been authenticated, a session can be established with a node, such as a service function classifier. The service function classifier adds relevant information (e.g., a cookie TLV value, as described below) to the Network Service Headers ("NSH") of the flow(s) received from that client, prior to forwarding those packets along their respective service paths. The information added to each NSH can be used by the downstream service nodes to determine if the user node and/or the client node that sent the packet has been authenticated prior to performing a service function. These systems and methods eliminate the need for the service nodes to individually query the authentication server separately for each packet or each series of related packets, even when one or more flows are received from one client in close temporal proximity to one or more flows received from one or more other clients.

Service Functions and the Service Topology Layer

Service functions are performed on an overlay or service topology layer of a network, which can be found, e.g., in Layer 2 and Layer 3 of the network. Service functions can include various tasks, such as, e.g., load balancing, routing packets to or through a firewall, network address translations (NATs), or accounting functions, such as, e.g., compiling statistics or otherwise keeping track of how many packets of a particular type come through the network, as well as numerous other functions.

The service layer is a network layer than can be implemented on top of a multiprotocol label switching ("MPLS") network, an Internet protocol ("IP") network, or any other appropriate network. As will be described in more detail below, a service topology layer of a network contains various service nodes. Each service node can be configured to perform one or more of service functions.

An inbound packet may be classified upon arrival at a node of the service topology layer, such as a service function classifier node, which will be described in more detail herein. This classification can be based on various information, such as, e.g., policy information and/or profile information pertaining to the client that sent the packet and/or to the external network that sent the packet to the service topology network. An ordered group of service functions, referred to herein as the "requested service functions," can be assigned to each packet based upon its classification. Based on the specific service functions that are requested for the packet, the service function classifier will determine the specific "service path" through which the packet should be routed through the service topology layer. This service path will be determined in a manner that allows each of the requested service functions to be properly applied by the service node(s) that are configured to perform each of the requested service functions.

Once the service path has been determined, the packet is then routed through the service topology network along the determined service path. Traversing the determined service path will generally require the packet being forwarded to multiple service nodes, each of which is configured to perform one (or potentially more) of the requested service function(s). In many instances, a single service node is not configured to perform all of the requested service function(s), particularly if more than one service function is requested. As one example, if the client has requested a firewall service, and accounting service, and a NAT service to be performed on the packet, the service path would commonly include three distinct service nodes, one for each of the three requested service functions. The service path may also potentially include intermediate nodes that can forward the packet through the network but are not configured to perform any of the requested service functions (although the intermediate nodes may be configured to perform other service functions that are not requested for the given packet).

Before each of the service node in the service path can perform the requested service function(s), that service node must first authenticate the client that sent the packet. This authentication is used to verify or ensure that the client has the proper authority or permission level for the requested service function to be performed by that service node. Currently, the service topology layer does not have any functionality that can be used to efficiently authenticate the client prior to performing each of the request service functions.

The disclosure provided herein therefore provides increased functionality at the service topology layer (or, simply, "service layer") of a network, such as is described herein. Among other aspects, the current disclosure enables a session to be authenticated on the service layer without requiring each service node to individually contact a distinct node (such as, e.g., an authentication node) to separately authenticate each packet that arrives at that given service node, even when one or more flows are received from a client node in close temporal proximity to one or more flows received from other clients nodes.

Example Service Topology Layer

FIG. 1A is a block diagram of a service topology layer of a network 100, according to one embodiment. Network 100 is configured to authenticate a session by using the systems and methods disclosed herein. More specifically, FIG. 1A depicts a group of client nodes 110(1)-110(*n*) (collectively, "client nodes 110") connected to an ingress node 120 of network 100. Client nodes 110 can be any computing device capable of being used in accordance with this disclosure, such as, e.g., a gateway, router, or switch (collectively, "router(s)"); or a personal computer, laptop computer, or mobile communication device such as a cell phone or tablet computer (collectively, "personal computer(s)"). Ingress node 120 can also be any computing device capable of being used in accordance with this disclosure, such as, e.g., a router, a server, or a personal computer.

A service topology layer can be configured to provide one or more service functions to a packet, such as packet 130. Each packet, such as packet 130, enters the service topology layer through an ingress node, such as ingress node 120. Among other information, each packet contains metadata about the client node that sent the packet. In one embodiment, the metadata associated with packet 130 includes information that identifies the client (e.g., a "client ID," such as a media access control ("MAC") address or other unique form of identification for the client) and an IP address (such as, e.g., a private IP address or other IP address) assigned to (or otherwise associated with) the client node.

As indicated above, an inbound packet, such as packet 130, may be classified upon arrival at ingress node 120 or at service function classifier 140. A packet may be classified based on various information, such as, e.g., policy information and/or profile information pertaining to the customer and/or to the external network that sent the packet to the service topology network. An ordered group of service functions, referred to herein as a "service function chain," can be applied to each packet based upon its classification. Upon determining the classification of incoming packet 130, the node (e.g., ingress node 120 or service function classifier 140) may determine that certain specific service functions should be applied to packet 130.

In one embodiment, upon entering the service topology layer, a Network Service Header ("NSH") is added to the packet before forwarding the packet on to the various nodes of the service topology layer. The NSH is typically added to the beginning of a packet, and is usually added to a packet by service function classifier 140, or a similar device. A NSH contains information that can be used to track and monitor the service functions that have been requested for that packet, among other things. The information added to the NSH can be used by the downstream service nodes to authenticate each packet prior to performing a service function.

As mentioned above, FIG. 1A also depicts packet 130. Although only a single packet is depicted in FIG. 1A, in practice packet 130 will most commonly be one of a series of packets ("flow") sent from a single client, such as any of client nodes 110. As shown in FIG. 1A, packet 130 is depicted at a point between ingress node 120 and service function classifier 140. In practice, however, packet 130 can appear anywhere within a network, including any node or any connection. Moreover, flows from multiple client nodes 110 can exist within network 100 at the same time, or at substantially the same time. Packets that exist within network 100 at the same time can be said to be within "close temporal proximity" to each other, as that term is used elsewhere herein.

Figure 1B:
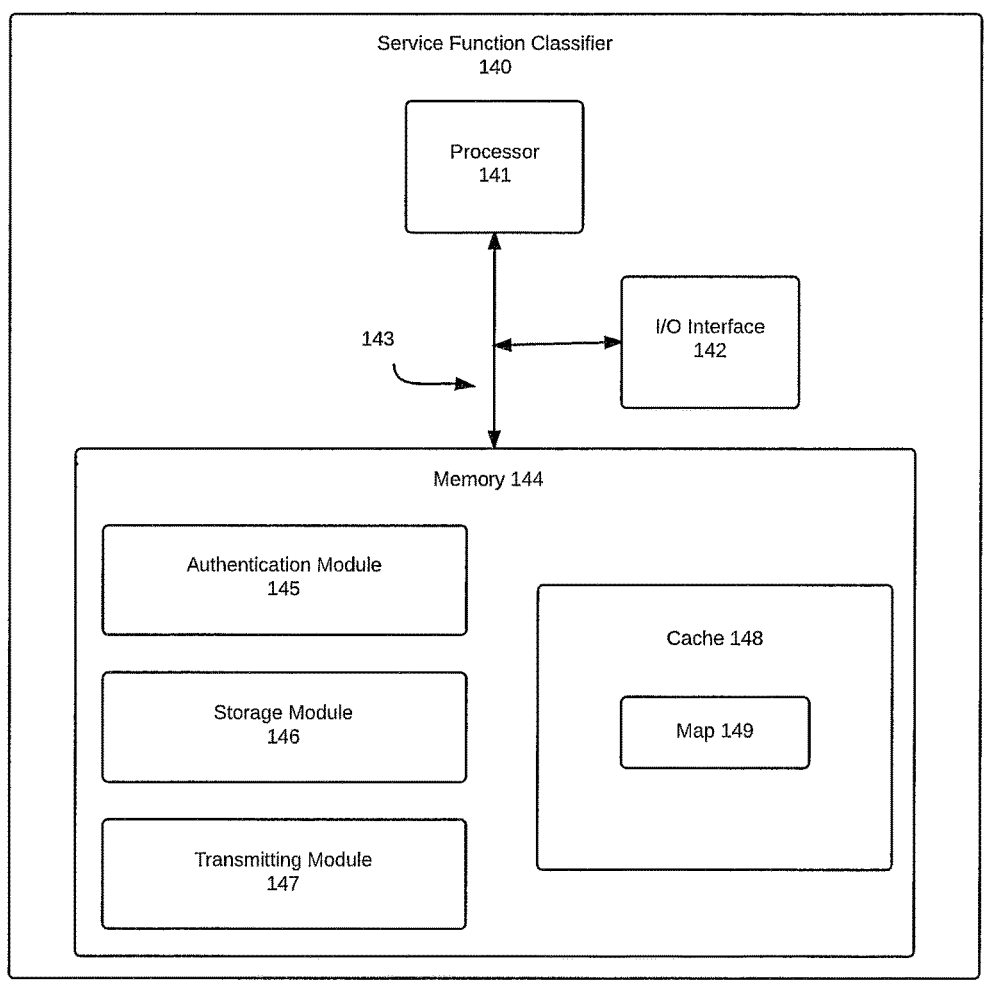
FIG. 1B is a block diagram showing additional details of a service function classifier, according to one embodiment.
Figure 1C:
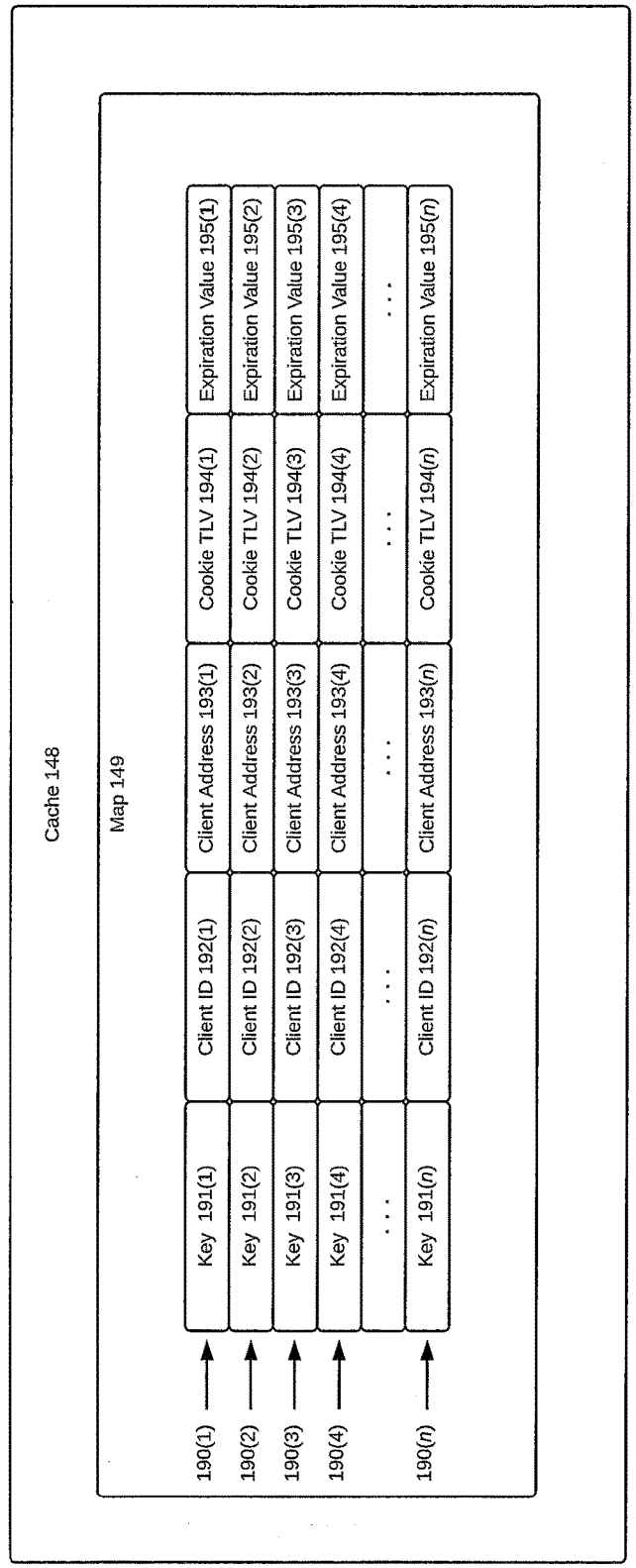
FIG. 1C is a block diagram showing additional details of a map as stored in a cache of a service function classifier, according to one embodiment.

Service function classifier 140 is a computing device, such as, e.g., a service node, that is configured to perform the specific authentication methods described herein, particularly the methods shown in FIG. 2 and described in conjunction therewith. Service function classifier 140 can also perform, and be used in conjunction with, the other systems and methods described herein. In addition to the other functionality described herein, service function classifier 140 also includes, at least, a cache, such as cache 148, as well as the modules and other features that are shown in FIGS. 1B and 1C, and are described in conjunction therewith.

FIG. 1A also depicts an authentication node 150, and an authentication database 160. Authentication node 150 can be any computing device that is capable of being configured to perform the relevant functionality described herein with respect to authentication nodes, especially the functionality shown in FIG. 3 and described in conjunction therewith. Authentication database 160 can be any database. Although authentication node 150 and authentication database 160 are depicted separately herein for the sake of clarity, in practice authentication database 160 can be part of authentication node 150, but can also be separate from (but connected to) authentication database 160 via a network or other appropriate connection.

FIG. 1A also depicts multiple service nodes 170(1)-170(*n*) (collectively, "service node(s) 170"). Service nodes 170 are connected to each other, and to other nodes, via network connections, such as network connections 180(1)-180(*n*) ("collectively, network connection(s) 180"). These network connections 180 as shown by the solid lines connecting the various nodes to each other. For the sake of space and clarity, only certain network connections 180 are expressly labeled in FIG. 1A. However, all of the solid lines connecting nodes to each other can be network connections, such as the network connections 180 that are expressly labeled. (FIG. 1A also shows dashed lines connecting service nodes 170 to authentication database 160. These dashed lines reflect certain queries that would otherwise be required, were it not for the systems and methods described herein.) Each service node is configured to perform one or more service functions, such as those described elsewhere herein. Although a service node can potentially perform more than one service function, each of service nodes 170 is most commonly configured to perform only a single service function. As such, service nodes 170(1)-170(*n*) are "chained" together to form a service path, whereby each service node 170 performs a distinct service function for each packet that is sent to the service topology layer, such as packet 130. FIG. 1A also depicts an egress node 190. Egress node 190 can be any computing device capable of being used in accordance with this disclosure, such as, e.g., a router, a server, or a personal computer.

Although one example network configuration is provided herein, many other network configurations are possible in accordance with this disclosure. Other network configurations may contain more or less nodes than the example network depicted in FIG. 1A.

FIG. 1B provides enhanced details of service function classifier 140. For instance, FIG. 1B depicts various modules that can be used in conjunction with this disclosure. Modules, such as those depicted in FIG. 1B, can be any combination of software and/or hardware that are configured, or capable of being configured, to perform the functionality associated with each such model. Modules contain computer instructions (e.g., computer code or other instructions) that can be executed by a processor, such as processor 141, in conjunction with an I/O interface, such as I/O interface 142. As shown in FIG. 1B, processor 141 and I/O interface 142 are connected to certain other components of service function classifier 140 via bus 143. In one embodiment, the modules are stored in a non-transient computer-readable storage medium, such as memory 144.

Examples of modules that may be included in service function classifier 140 are depicted in FIG. 1B. For instance, FIG. 1B depicts an authentication module 145, which can be configured to work in conjunction with authentication server 150 to authenticate an incoming packet or flow. In one embodiment, authentication module 145 is configured to perform one or more steps of method 200, which is described in more detail below. In various embodiments, authentication module 145 is configured to perform, e.g., steps 225, 230, 265, 270, 275, 276, and 277, as well as other functionality such as is described herein. FIG. 1B also depicts a storage module 146, which can be configured to perform one or more storage-related features of this disclosure. In various embodiments, authentication module 145 is configured to perform one or more steps of method 200, such as, e.g., step 260, as well as other functionality such as is described herein. Similarly, transmitting module 147 can be configured to perform one or more features related to receiving, routing, and forwarding packets, such as, e.g., steps 210, 220, 240, 250, 280 and 290, as well as other functionality such as is described herein.

FIG. 1B also depicts map 149, which is stored in cache 148 of service function classifier 140. FIG. 1C provides enhanced details of map 149. As can be seen in FIG. 1C, map 149 contains multiple records 190(1)-190(*n*) (collectively, "record(s) 190"), as depicted by each of the logical rows of map 149 shown in FIG. 1C. Each record 190 is configured to store various information associated with the systems and methods described herein. In the specific example embodiment depicted in FIG. 1C, each record 190 of map 149 contains a unique key, a client ID, a client address, a cookie TLV, and an expiration value for the record. These terms are described in more detail below.

As shown in FIG. 1C, each unique key 191(1)-191(*n*) (collectively, "key(s) 191") contains a unique value that can be used to identify the corresponding record 190. Each client ID 192(1)-192(*n*) (collectively, "client ID(s) 192") contains a value that uniquely identifies the client to which the corresponding record pertains. In one embodiment, the client ID can be a unique ID generated for the user or for an IP address. Although each key 191 must be completely unique, each client ID 192 does not necessarily have to be completely unique with respect to the other records 190 stored in map 149. For instance, map 149 could contain two distinct records 190 that are both associated with the same client, and which would thus have the same client ID 192. Each client address 193(1)-193(*n*) (collectively, "client address(es) 193") contains the private IP address (or other internet address) that is associated with the corresponding client ID 192. As will be discussed in more detail below, each cookie TLV 194(1)-194(*n*) (collectively, "cookie(s) 194") contains the session information for the corresponding client record 190. As will be explained in more detail below, each of these cookies 194 is stored, in one embodiment, in a type-length-value ("TLV") format that can be inserted into a Network Service Header ("NSH") of a packet, such as packet 130. Finally, each expiration value 195(1)-195(*n*) (collectively, "expiration value(s) 195") contains a value that indicates when the corresponding cookie or record expires. In one embodiment, expiration values 195 can take the form of a "time to live" ("TTL") value, or other similar value.

Service Function Classifier's Role in Packet Authentication

FIG. 2 is a flowchart of method 200 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment.

Method 200, which is described with reference to the example elements shown in FIGS. 1A-1C, shows a procedure that can be performed by a node in accordance with this disclosure. More specifically, method 200 depicts a method for authenticating a packet and/or a series of packets received from a client on the service topology layer. In one embodiment, method 200 can be performed by a node, such as service function classifier 140.

Method 200 begins at step 210, where a packet, such as packet 130, is received by a node, such as service function classifier 140. In one embodiment, packet 130 is received on the service topology layer of a network, such as network 100. In one embodiment, packet 130 is received at service function classifier 140, which received the packet from an ingress node, such as ingress node 110. As shown in FIG. 1, as an example, packet 130 will generally have been sent to network 100 by a client or user (collectively, "client"), such as any of client nodes 110(1)-(*n*). Regardless of the specific path traveled by packet 130 prior to being received in step 210, packet 130 contains information identifying the client that sent packet 130 to network 100, such as, e.g., a client ID and a client address. In one embodiment, this information can be ascertained by inspecting metadata associated with packet 130.

In step 215, method 200 makes a determination as to whether a session already exists for the client that sent the packet. A node, such as service function classifier 140, can make this determination by querying a memory, such as map 149 stored in cache 148, to determine if current session information exists for the client that sent packet 130. In one embodiment, this determination is made by querying map 149 to determine if at least one record 190 exists that is associated with a client ID or IP address associated with the client that sent packet 130. In one embodiment, this query can involve using an SQL statement to select all records 190 where the client ID associated with packet 130 is found in the client ID 192 field of map 149, and/or all records where the client address associated with packet 130 is found in the client address 192 field of map 149.

As is explained in more detail elsewhere in this disclosure, a current session will exist for the current client if another packet was previously received and authenticated for this client, and that session has not yet expired. Thus, in one embodiment, a session will exist if method 200 was previously performed with respect to a previous packet sent from the same client, and that session has not yet timed out. When that previous packet was authenticated during a previous iteration of method 200, an indication would have been stored in a memory, such as map 149. More details regarding storing this information in map 149 is discussed below, in conjunction with step 250. In other embodiments, a session may have been previously created through a different sequence of actions. Regardless of how the session record was created, step 215 will determine that a session exists for this client if service function classifier 140 finds current (i.e., unexpired) session information for the client that sent packet 130 in map 149.

If a determination is made in step 215 that a current session exists for this client, method 200 will attempt to authenticate packet 130 in step 220 by using information stored in the cache of the node performing the authentication. In one embodiment, this authentication uses information stored in map 149, which is stored in cache 148 of service function classifier 140. By authenticating the packet's session from a local cache, this method eliminates the need to authenticate subsequent flows from the same client before forwarding the packet(s) of those flows to the service node(s). In one embodiment, the information stored in map 149 can include the information depicted in FIG. 1C, including a cookie, such as cookie 194. In one embodiment, the selected record 190 that includes cookie 194 also includes an expiration value 195. Expiration value 195 can take the form of a time to live ("TTL") value, or similar information, which identifies the time at which the session for this client will expire. Although not expressly depicted in FIG. 1C, the cookie can also contain information indicating the type of authentication that was performed for this client. In one embodiment, the session will be authenticated if service function classifier 140 finds a cookie 194 in a record 190 that is associated with the client that sent packet 130, the cookie indicates that the client was previously and properly authenticated, and the cookie has not expired as based on the expiration value 195. In other embodiments, other methods (or combinations of factors) can be used to authenticate the session for the client that sent packet 130. After completing step 220, method 200 will proceed to step 255, which is discussed in more detail below. If steps 220 and 255 are successfully completed, then service function classifier 140 does not have to forward this packet 130 to authentication node 150, nor do any of the downstream service nodes have to query authentication node 150 or authentication database 160. Therefore, various subsequent queries are avoided, such as those represented, e.g., by the dashed lines in FIG. 1A.

Figure 3:
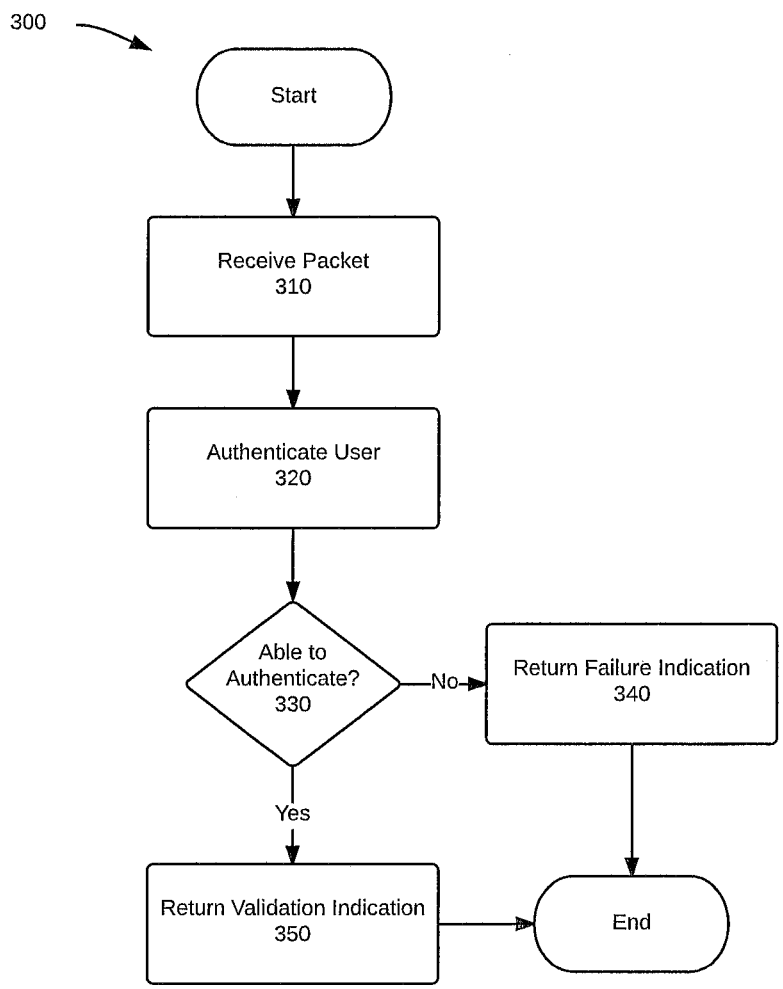
FIG. 3 is a flowchart that illustrates actions that can be performed by an authentication node to authenticate a packet and perform other functionality, according to one embodiment.

If a determination is made in step 215 that a current session does not exist for the client that sent packet 130, service function classifier 140 will forward packet 130 to a node used for authentication, such as authentication node 150, as can be seen in step 240. (If method 200 determines that a record corresponding to the current client exists in map 149, but that record or corresponding cookie or session has expired, then the session will no longer be deemed "current." Although not expressly depicted in FIG. 2, if method 200 determines at any point that the cookie or session for a given client is not current (i.e., has expired), method 200 can delete the corresponding record 190 from map 149 and method 200 can resume with step 230.) At this point, the authentication node (e.g., authentication node 150, potentially working in conjunction with authentication database 160) will attempt to authenticate packet 130. More specific details of this authentication process will be provided below, in conjunction with the discussion of method 300, as shown in FIG. 3. For our instant purposes, it will suffice to note that authentication node 150 will send an indication back to service function classifier 140 following the authentication. This indication includes information indicating the result of the authentication attempt, in addition to other potential information, such as is described elsewhere herein. This indication is received from the authentication node in step 240.

The information included in this indication can be stored in a memory in step 250. In one embodiment, this information can be stored in map 149 as a record 190, or as part of a record 190. As indicated above, each record 190 can include a key 191, which can be a unique identifier that is automatically generated when the record is created. Each record 190 also includes client ID 192 and client address 193, both of which can be ascertained from metadata associated with packet 130, and which are described in more detail elsewhere herein. Client ID 192 and client address 193 can be used to relate the information stored in record 190 to the client that sent packet 130. Each record 190 also includes a cookie TLV 194, which can take the form of a cookie or token (collectively, "cookie"), session, or similar data structure used to store session information. In one embodiment, the cookie TLV 194 can be received as part of the indication received in step 240. In another embodiment, the cookie TLV 194 can be created by service function classifier 140 in response to receiving an indication (that the authentication was successful) in step 240. Record 190 also contains an expiration value 195, which indicates the time at which the associated cookie or session information will expire. In one embodiment, expiration value 195 may take the form of a "time to live" ("TTL") value. In one embodiment, expiration value 195 may take the form of a date-time stamp, or other similar value. After storing the relevant information in a memory, such as map 149 in cache 148 of service function classifier 140, method 200 then proceeds to step 255.

In step 255, method 200 determines whether the session has been properly authenticated. In one embodiment, this determination can be made by examining a cookie (such as a cookie identified in step 220, or a cookie stored in step 250) or other information to determine whether a current session exists for the client that sent packet 130 to network 100. In one embodiment, the cookie (or other information) is stored in a memory, such as map 149 stored in cache 148 of service function classifier 140. Step 255 can also include inspecting expiration value 195, or a similar value, to determine whether the cookie or session is still active, or whether the cookie or session has expired. (Although not expressly depicted in FIG. 2, if method 200 determines at any point that the cookie or session for a given client has expired, method 200 can delete the corresponding record 190 from map 149. If the cookie or session is determined to have expired, then method 200 can resume at step 230.) If step 255 determines that the client is authenticated, and that the corresponding session has not expired, method 200 will proceed to step 270, which is described in more detail below.

If method 200 determines in step 255 that packet 130 has not been properly authenticated, or that the session corresponding to the client has expired, then method 200 can attempt an alternate authentication method in step 260. As some examples, the alternative authentication method can include one or more of an OAuth protocol, one or more NT Lan Manager (NTLM) protocols, a captive portal authentication method (such as by using, e.g., a captive portal webpage), and/or authenticating the user as a "guest." In one embodiment, these protocols are deployed in a prioritized order. For instance, in one such order, the flow is first subjected to OAuth; if OAuth fails, one or more NTLM protocols are performed; if NTLM authentication fails, the user is redirected to a captive portal; and if all of the foregoing authentication methods fail, the user is treated as a guest user and assigned basic privileges. A determination will then be made in step 265 as to whether the alternative authentication method was successful. If a determination is made in step 265 that the alternative authentication method was successful, then method 200 proceeds to step 270, which will be described in more detail below. If a determination is made in step 265 that the alternative authentication method was not successful, then method 200 proceeds to step 266. In step 266, a determination is made as to whether service function classifier 140 is configured to allow packet 130 to be authenticated as a default user or guest (collectively, "default user"). (Although still allowed to proceed through the service topology layer, a packet that is authenticated under a default user profile may not have access to all of the service functions that the client or packet is otherwise requesting. The precise handling of such default authentication methods, and the consequences thereof, are beyond the scope of this disclosure.) If service function classifier 140 is configured to allow packet 130 to be authenticated as a default user, then default properties are assigned to packet 130 in step 267. Those default properties will be added to packet 130 in step 270, which is described in more detail below. If method 200 determines in step 266 that service function classifier 140 is not configured to allow packet 130 to be authenticated as a default user, then method 200 ends.

As can be seen from FIG. 2, there are multiples paths that method 200 can follow to arrive at step 270. Regardless of how method 200 arrives at step 270, by the time step 270 is performed, packet 130 will have already been authenticated. As discussed above, packet 130 could have been based on information about the client that sent packet 130, based on an alternate authentication method, or as a default user or guest. In any of the forgoing scenarios, method 200 determines the service path for the packet in step 270. The service path identifies the specific nodes in the service topology layer through which the packet should be routed in order to apply all of the requested service functions. The exact manner in which this service path is determined is not relevant here. Indeed, any method for determining the service path can be used, such as the systems and methods disclosed in U.S. application Ser. No. 14/587,981, entitled "Multi-path Aware Tracing and Probing Functionality at Service Topology Layer," to Nobushige Akiya, et al., filed on Dec. 31, 2014, commonly assigned to Cisco Technology, Inc., and which is incorporated by reference as though fully set forth in its entirety herein.

The relevant authentication information will be inserted into packet 130 in step 280. In one embodiment, the authentication information can be indicated in a field in the Network Service Header ("NSH") of packet 130, such as in a type-length-value ("TLV") field in the NSH. In one embodiment, the information stored in the TLV field includes a token, such as, e.g., an opaque token, or a ticket (collectively, "token"); a recommended "time to live" ("TTL") value, which indicates the expiration of the token; information indicating the type of authentication that was performed; and/or other information, such as the types of information stored in records 190. By including this information in the NSH, the subsequent service nodes in the service path can authenticate packet 130 by inspecting the NSH of the packet, rather than requiring each node to query the authentication node at each hop of the service path. In one embodiment, the authentication information may be indicated in a different manner associated the packet, without using an NSH per se. In one embodiment, the authentication information may be set in the NSH, but in a manner that does not involve the use of a TLV field.

Regardless of how the authentication information is indicated in packet 130, method 200 proceeds to step 290 after the relevant authentication information has been set in packet 130 in some manner. In step 290, the packet is forwarded to a service node, such as any of service nodes 170. The specific service node to which packet 130 is sent at this point is beyond the scope of this disclosure, but will generally be determined based on the service path that was determined in step 220. Once the packet is forwarded in step 290, method 200 ends.

Authentication Node's Role in Packet Authentication

FIG. 3 is a flowchart of method 300 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment.

Method 300, which is described with reference to the example elements shown in FIGS. 1A-1C, shows a procedure that can be performed by a node in accordance with this disclosure. More specifically, method 300 depicts a method for authenticating a packet and/or a series of packets received from a client on the service topology layer. In one embodiment, method 300 can be performed by a node, such as authentication node 150.

Method 300 begins at step 310, when a node receives a packet. In one embodiment, authentication node 150 receives packet 130 in step 310. In one embodiment, packet 130 is received directly from service function classifier 140. In another embodiment, not expressly depicted in FIG. 1A, packet 130 can be received from an intermediary node that forwarded packet 130 from service function classifier 140 to authentication node 150. In either situation, regardless of any potential intermediate hops, the packet received by authentication node 150 in step 310 is a packet that was previously sent from service function classifier 140.

In step 320, method 300 authenticates (or attempts to authenticate) the client that sent packet 130. In one embodiment, step 320 is performed by authentication node 150. The packet can be authenticated in a variety of ways including, e.g., an HTTP captive portal, Kerberos authentication, or IEEE 802.1x, among other potential authentication methods. In one embodiment, the authentication of step 320 includes authentication node 150 querying authentication database 160 as part of the authentication process. As indicated elsewhere, authentication database 160 is depicted in FIG. 1A as a distinct node separate from, but connected to, authentication node 150. In other embodiments, authentication database 160 can be part of (e.g., stored in memory in) authentication node 150.

In step 330, a determination is made as to whether method 300 was able to authenticate the client that sent packet 130. In one embodiment, this determination is made by authentication node 150. If a determination is made in step 330 that packet 130 was unable to be authenticated in step 320, method 300 then returns a failure indication in step 340, and method 300 will then end. In one embodiment, this failure indication may be returned to service function classifier 140. If a determination is made in step 330 that packet 130 was able to be authenticated in step 320, method 300 then returns a validation indication in step 350, and method 300 will then end. In one embodiment, this validation indication may be returned to service function classifier 140. In one embodiment, this validation indication may take the form of a packet, and may contain information such as, e.g., the identity of the client, an IP address associated with the client node, the authentication method used, the time at which the authentication was completed, and other relevant information such as is described herein.

As indicated above, a series of packets ("flow") from a single client often enter the service topology layer of a network within close temporal proximity to each other. Once method 300 has been performed for a single one of those packets, method 300 does not have to be performed with respect to the remaining flow(s) from that client unless and until the current session expires. Instead, service nodes 170 can inspect packet 130 itself to determine if packet 130 has been properly authenticated, such as by inspecting the information stored in the NSH in conjunction with the systems and methods described elsewhere herein. Accordingly, the other service nodes (e.g., service nodes 170(1)-(n)) in the service topology layer receive a significant performance improvement because they do not have to individually authenticate each packet that each of those nodes receives. As such, substantial benefits are realized (e.g., decreased processing time and decreased throughput time) because the remaining service nodes can simply process and/or route the packet without having to individually query authentication node 150 and/or authentication database 160 for each packet received at each service node. Additional efficiency and other benefits are also realized when a client sends one or more flows to the service topology layer in close temporal proximity to one or more flows from other clients. In the case where multiple clients are sending flows in close temporal proximity to each other, a service node may not be able to authenticate a single packet on behalf of an entire group of packets (e.g., one packet out of the flow from a single client), because consecutive packets may not necessarily have been sent from the same client. Accordingly, substantial benefits are realized as the result of the systems and methods described herein, particularly with respect to time and efficiency.

Service Node's Role in Packet Authentication

Figure 4:
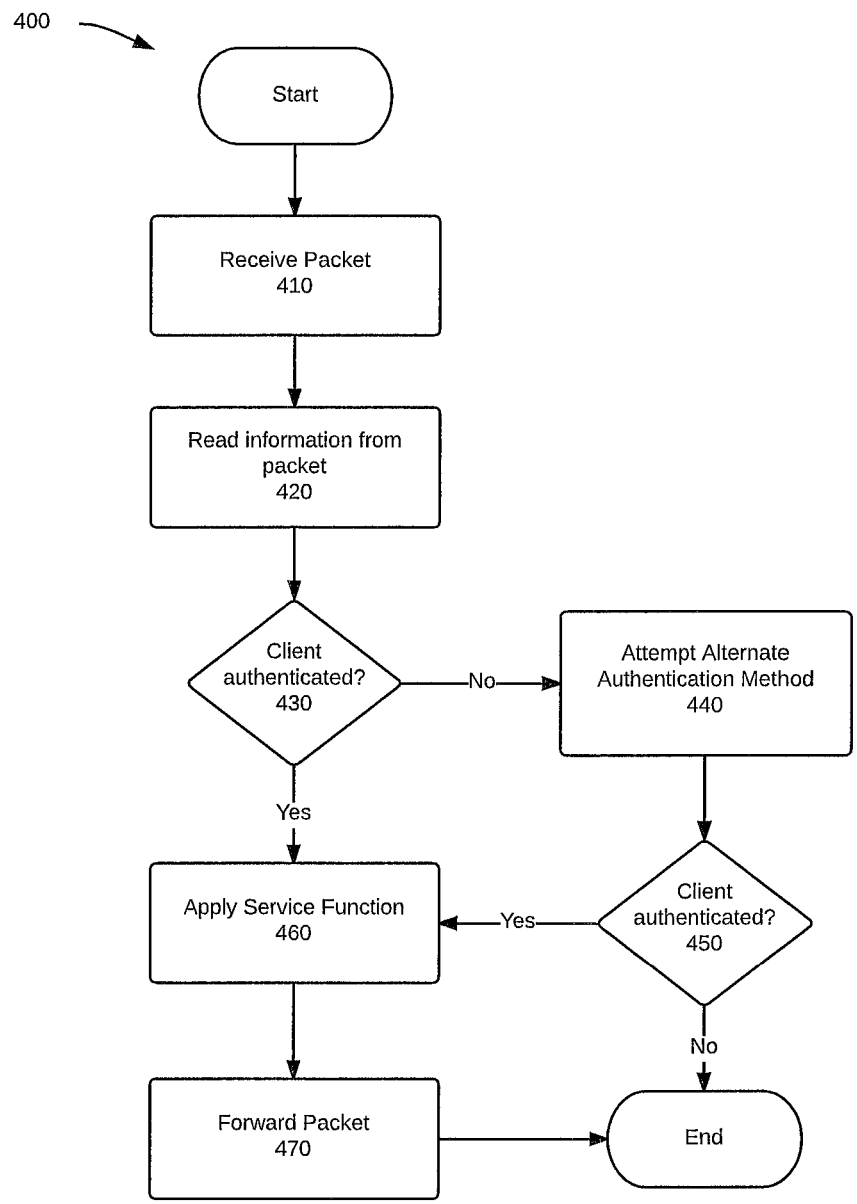
FIG. 4 is a flowchart that illustrates actions that can be performed by a service node to authenticate a packet and perform other functionality, according to one embodiment.

FIG. 4 is a flowchart of method 400 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment.

Method 400, which is described with reference to the example elements shown in FIGS. 1A-1C, shows a procedure that can be performed by a node in accordance with this disclosure. More specifically, method 400 depicts a method for authenticating a packet and/or a series of packets received from a client on the service topology layer. In one embodiment, method 400 can be performed by a node, such as any of service nodes 170(1)-(n) (collectively, "service nodes 170").

Method 400 begins at step 410, when a node receives a packet. In one embodiment, one of service nodes 170 receives packet 130 in step 410. Packet 410 can be received directly from service function classifier 140, or packet 130 can be received from a different one of service nodes 170. In other embodiments, packet 130 can be received in step 410 from a different intermediary node that forwarded packet 130, but where that intermediary node was not a service function classifier or a service node (or, alternatively, is a service node but did not perform any service functions on packet 130).

After receiving the packet, the node inspects the packet in step 420 to determine if the client that sent the packet has been authenticated. In one embodiment, the service node 170 that receives packet 130 will inspect the NSH of the packet to determine the relevant information, such as is described elsewhere herein. In one embodiment, the relevant information can take the form of the authentication information stored in the NSH in step 280. As indicated above, this information can be stored as a TLV value in the NSH. In one embodiment, this information includes a token, such as, e.g., an opaque token, or a ticket (collectively, "token"); a recommended "time to live" ("TTL") value, which indicates the expiration of the token; information indicating the type of authentication that was performed; information identifying the client and/or the client's IP address; as well as other relevant information, such as, e.g., the information that is described elsewhere herein or that would otherwise be appropriate to be stored in a packet and/or a NSH of a packet. As indicated above, the inclusion of this information in the NSH enables service nodes 170 to authenticate packet 130 by inspecting the NSH of the packet, rather than being required to query the authentication node for each arriving packet or group of packets.

After inspecting packet 130 in step 420, method 400 then determines in step 430 whether the client that sent the packet has been properly authenticated. If method 400 determines that packet 130 was not properly authenticated by a previous node, then method 400 proceeds to step 440. If method 400 determines that packet 130 has been properly authenticated by a previous node (e.g., by service function classifier 140 and/or authentication node 150), then method 400 proceeds to step 460.

If method 400 determines in step 430 that packet 130 has not been properly authenticated, then method 400 can attempt an alternate authentication method in step 440. In one instance, method 400 can perform this alternate authentication method by querying authentication node 150 directly. This form of authentication, however, is not ideal, as it would require the current service node 170 to query authentication node 150 directly, thereby increasing the amount of time needed to perform the needed service functions and route packet 130 through the service topology layer. As some other examples, the alternative authentication method can include one or more of an OAuth protocol, one or more NT Lan Manager (NTLM) protocols, a captive portal authentication method (such as by using, e.g., a captive portal webpage), and/or authenticating the user as a "guest." In one embodiment, these protocols are deployed in a prioritized order. For instance, in one such order, the flow is first subjected to OAuth; if OAuth fails, one or more NTLM protocols are performed; if NTLM authentication fails, the user is redirected to a captive portal; and if the all of the foregoing authentication methods fail, the user is treated as a guest user and assigned basic privileges.

A determination will then be made in step 450 as to whether the alternative authentication method was successful. If a determination is made in step 450 that the alternative authentication method was not successful, then method 400 ends. If a determination is made in step 450 that the alternative authentication method was successful, then method 400 proceeds to step 460, which will be described in more detail below.

In step 460, the relevant service function(s) is/are applied by the current service node 170. The exact manner in which the service functions are applied is not relevant here. Indeed, any method for applying the relevant service function(s) can be used, such as the systems and methods disclosed in U.S. application Ser. No. 14/587,981, entitled "Multi-path Aware Tracing and Probing Functionality at Service Topology Layer," to Nobushige Akiya, et al., filed on Dec. 31, 2014, and commonly assigned to Cisco Technology, Inc. After the relevant service functions are applied by the current service node 170, method 400 then forwards packet 130 to the next node in the service path, which is shown in step 470. As can be seen from FIG. 1A, the next node can be either another service node 170; an egress node, such as, e.g., egress node 180; or an intermediary node (not expressly depicted in FIG. 1A), which can forward packet 130 to the appropriate node. The current iteration of method 400 then ends, although the next node can perform another iteration of method 400 upon receiving packet 130, especially if the next node is another of service nodes 170.

Example Networking Devices

Figure 5:
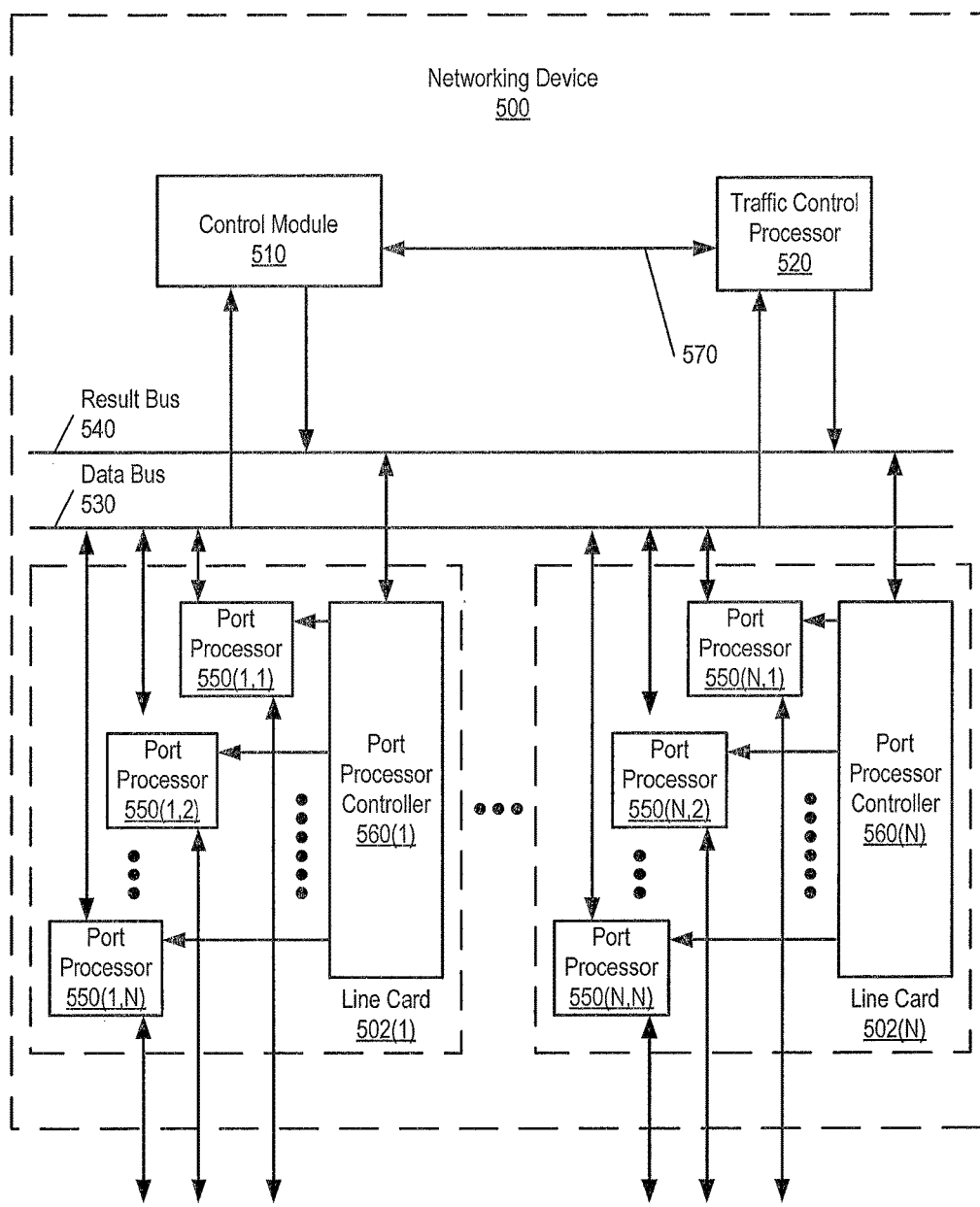
FIG. 5 is a block diagram illustrating components of an example networking device in which the present disclosure can be implemented, according to one embodiment.

FIG. 5 is a block diagram illustrating components of an example networking device 500, which depicts (at least in part) one configuration of a network device or a network routing element (e.g., a hub, router, switch, or similar device). In this depiction, networking device 500 includes a number of line cards (line cards 502(1)-502(N)) that are communicatively coupled to a control module 510 (which can include a forwarding engine, not shown) and a traffic control (or flow control) processor 520 via a data bus 530 and a result bus 540. Line cards 502(1)-(N) include a number of port processors 550(1,1)-550(N,N) which are controlled by port processor controllers 560(1)-560(N). It will also be noted that control module 510 and route processor 520 are not only coupled to one another via data bus 530 and result bus 540, but are also communicatively coupled to one another by a communications link 570. It is noted that in alternative embodiments, each line card can include its own forwarding engine.

When a message (e.g., an authorization request, a commissioning certificate, or a commissioning complete confirmation message) is received by a network device or network routing element such as networking device 500, the message is identified and analyzed in the following manner. Upon receipt, a message (or some or all of its control information) is sent from one of the port processors 550(1,1)-550(N,N) at which the message was received to one or more of those devices coupled to data bus 530 (e.g., others of port processors 550(1,1)-550(N,N), a forwarding engine, and/or route processor 520). Handling of the message can be performance, for example, by a forwarding engine in accordance with the systems and methods disclosed herein. For example, a forwarding engine may determine that the message should be forwarded to one or more of port processors 550(1,1)-550(N,N). This can be accomplished by indicating to a corresponding one(s) of port processor controllers 560(1)-560(N) that the copy of the message held in the given one(s) of port processors 550(1,1)-550(N,N) should be forwarded to the appropriate one of port processors 550(1,1)-550(N,N).

Networking device 500 can be used, for example, in the implementation of a network device (e.g., OEM builder device 120 or asset registry 130) or a network routing element in control module 510, or in one or more of port processor controllers 560(1)-560(N) and/or in route processor 520, in order to implement the present disclosure. Although not shown, network device 500 can also be used to implement a routing protocol module and/or network reachability protocol module in control module 610, in one of port processor controllers 560(1)-560(N), and/or in route processor 520 (not shown).

An incoming message (e.g., an authorization request, a commissioning certificate, or a commissioning complete confirmation message) can be provided to a network device or network routing element via a forwarding engine or port processor of a line card coupled to a port that received the incoming message. Network device 500 can be configured to process the incoming message and to generate one or more outgoing messages (e.g., an authorization request, a commissioning certificate, or a commissioning complete confirmation message), as described throughout this disclosure.

The outgoing message can be provided to a forwarding engine by a network device or a network routing device, which can determine that the outgoing message should be forwarded to one or more of port processors 550(1,1)-550 (N,N) that are configured to transmit the outgoing message toward the outgoing message's destination.

Figure 6:
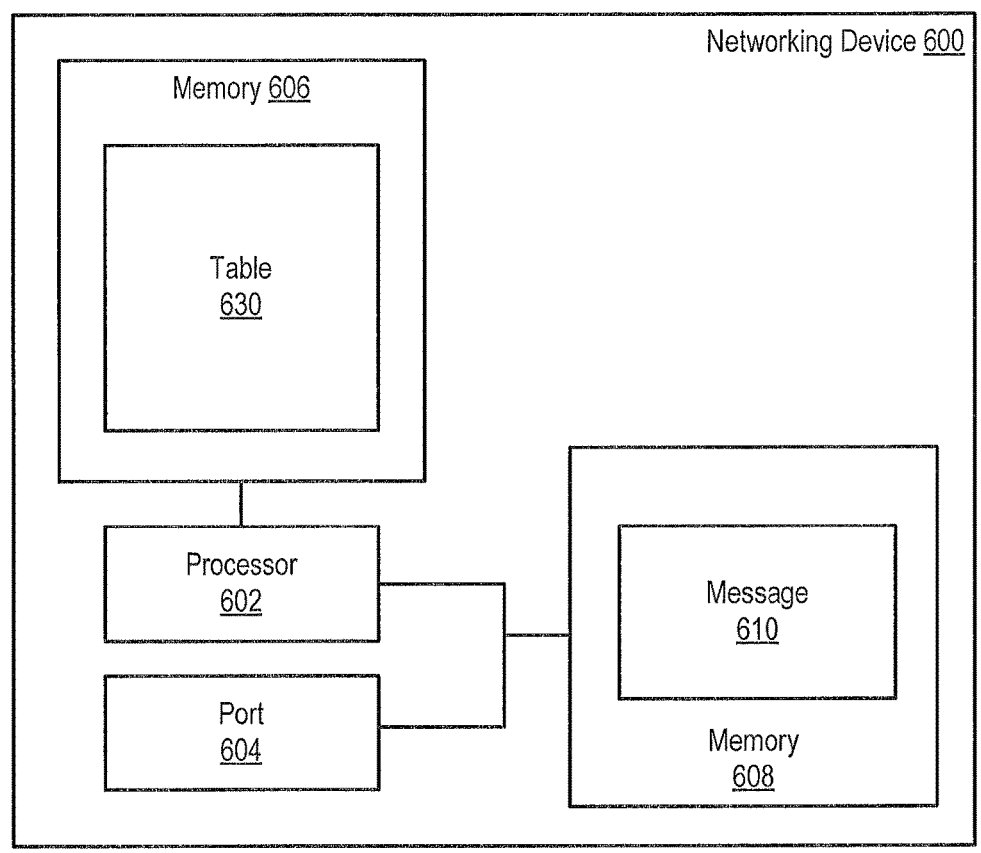
FIG. 6 is a block diagram illustrating components of an example networking device in which the present disclosure can be implemented, according to one embodiment.

FIG. 6 is a block diagram illustrating components of an example networking device 600, in which the networking device is configured as a network device (e.g., OEM builder device 120 or asset registry 130) or a network routing element. As illustrated, networking device 600 includes one or more processors 602 (e.g., microprocessors, PLDs (Programmable Logic Devices), or ASICs (Application Specific Integrated Circuits)) configured to execute program instructions stored in memories 606 and/or 608, which are computer readable storage media. Memories 606 and 608 can include various types of RAM (Random Access Memory), ROM (Read Only Memory), Flash memory, MEMS (Micro Electro-Mechanical Systems) memory, and the like. Networking device 600 also includes one or more ports 604 (e.g., one or more hardware ports or other network interfaces that can be linked to other networking devices, hosts, servers, storage devices, or the like). Processor 602, port 604, and memories 606 and 608 are coupled to send and receive data and control signals by one or more buses or other interconnects.

In this example, program instructions executable to implement the systems and methods disclosed herein are stored in memory 606. Topology information and network reachability information can be stored in one or more tables 630.

Message 610 (e.g., an authorization request, a commissioning certificate, or a commissioning complete confirmation message) is stored in memory 608. In one embodiment, message 610 can be received from port 604 (e.g., received from another networking device coupled to port 604), and can be stored in memory 608 before being provided forwarded to another networking device in accordance with the systems and methods of this disclosure. In one embodiment, outgoing message 610 can be generated and stored in memory 608 before being transmitted via port 604.

Example Computing and Network Environment

As shown above, the present disclosure can be implemented using a variety of computer systems and networks. An example of one such computing environment is described below with reference to FIG. 7.

Figure 7:
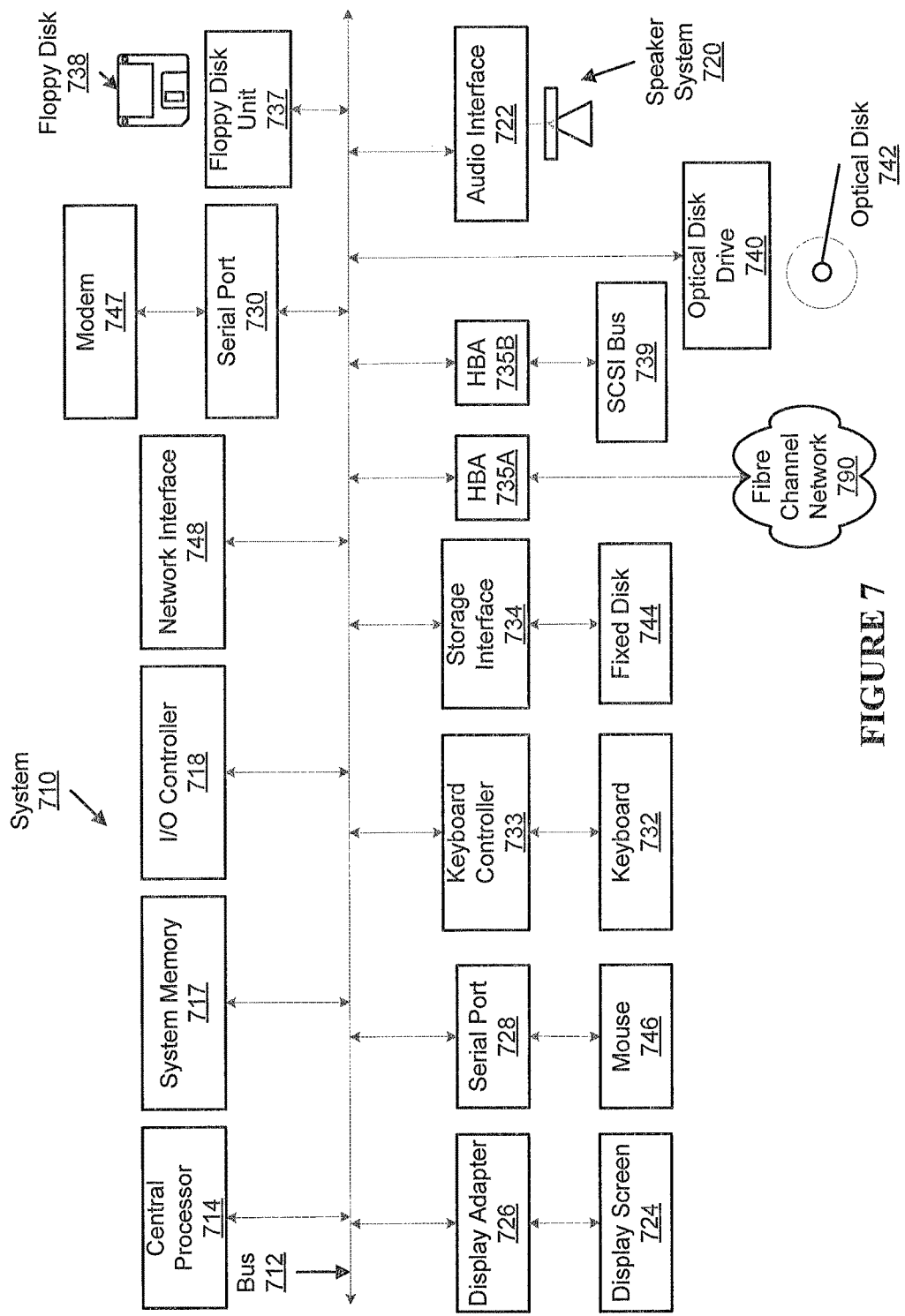
FIG. 7 is a simplified block diagram of a network architecture suitable for implementing aspects of the present disclosure, according to one embodiment.

FIG. 7 depicts a block diagram of a computer system 710 suitable for implementing aspects of the present disclosure. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident within (or otherwise added to or stored in) computer system 710 are generally stored on and accessed via a computer-readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present disclosure. The devices and subsystems can be interconnected in different ways from that shown in FIG. 7. The operation of a computer system such as that shown in FIG. 7 is readily known in the art and is not discussed in detail in this application. Code to implement the present disclosure can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present disclosure has been described in connection with several embodiments, this disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   receiving a first packet at a service function classifier node in a service topology layer, wherein
   the service function classifier node comprises a cache, and
   the first packet is received from a first client node in the service topology layer;
   determining that a session has not been established for the first client node;
   in response to determining that a session has not been established for the first client node, forwarding the first packet to an authentication node;

authenticating the first packet at the authentication node;
subsequent to authenticating the first packet, storing authentication information in the cache of the service function classifier node, wherein
the storing is configured to allow the service function classifier node to authenticate a subsequent packet received from the first client node;
in response to authenticating the first packet, setting a value in a header of the first packet, wherein
the value indicates that the first packet is authenticated in the service topology layer; and
forwarding the first packet to a first service node in the service topology layer, wherein the first service node is configured to perform a first service function, and
the first service node uses the value in the header to authenticate the first packet prior to performing the first service function.

2. The method of claim 1, further comprising:
establishing a session related to the first client node, wherein
the session comprises information about the first client node.

3. The method of claim 2, wherein the authenticating comprises
determining whether a session has been established in the service topology layer for the first client node.

4. The method of claim 3, wherein the authenticating further comprises:
in response to determining that the session has been established for the first client node, authenticating the first packet based, at least in part, on the information stored in the cache.

5. The method of claim 1, wherein the authenticating further comprises:
in response to the forwarding the first packet to the authentication node, receiving an indication from the authentication node.

6. The method of claim 1, wherein the forwarding comprises:
determining a service path associated with the first packet, wherein the determining is performed prior to the forwarding the first packet to the authentication node.

7. The method of claim 1, further comprising:
subsequent to authenticating the first packet, receiving a second packet at the service function classifier node, wherein
the second packet is received from the first client node;
authenticating the second packet by using the authentication information stored in the cache of the service function classifier node; and
subsequent to authenticating the second packet, forwarding the second packet to a second service node in the service topology layer.

8. A system comprising:
a service function classifier node, wherein
the service function classifier node comprises
a first microprocessor,
a cache, and
a non-transitory computer-readable storage medium, comprising computer instructions executable by the first microprocessor, wherein the computer instructions are configured to perform a method comprising the steps of:
receiving a first packet, wherein
the first packet is received from a first client node in a service topology layer,
determining that a session has not been established for the first client node,
in response to determining that a session has not been established for the first client node, forwarding the first packet to an authentication node,
authenticating the first packet at the authentication node,
subsequent to authenticating the first packet, storing authentication information in the cache of the service function classifier node, wherein
the storing is configured to allow the service function classifier node to authenticate a subsequent packet received from the first client node,
in response to authenticating the first packet, setting a value in a header of the first packet, wherein
the value indicates that the first packet is authenticated in the service topology layer, and
forwarding the first packet to a first service node in the service topology layer, wherein
the first service node is configured to perform a first service function,
the first service node uses the value in the header to authenticate the first packet prior to performing the first service function, and
the first service node comprises at least a second processor.

9. The system of claim 8, wherein the method further comprises:
establishing a session related to the first client node, wherein
the session comprises information about the first client node.

10. The system of claim 9, wherein the authenticating further comprises:
determining whether a session has been established in the service topology layer for the first client node.

11. The system of claim 10, wherein the authenticating of the first packet further comprises:
in response to determining that the session has been established for the first client node, authenticating the first packet based, at least in part, on the information stored in the cache.

12. The system of claim 8, wherein the authenticating further comprises:
in response to forwarding the first packet to the authentication node, receiving an indication from the authentication node.

13. The system of claim 8, wherein the forwarding comprises:
determining a service path associated with the first packet, wherein the determining is performed prior to the forwarding the first packet to the authentication node.

14. A non-transitory computer-readable storage medium comprising:
a plurality of program instructions, comprising
a first set of instructions, executable on a computer system, configured to
receive a first packet at a service function classifier node, wherein
the service function classifier node comprises a cache, and
the first packet is received from a first client node in a service topology layer, determine that a session has not been established for the first client node, and in response to determining that a session has not been established for the first client node, forward the first packet to an authentication node;

a second set of instructions, executable on the computer system, configured to authenticate the first packet at the authentication node, subsequent to authenticating the first packet, storing authentication information in the cache of the service function classifier node, wherein the storing is configured to allow the service function classifier node to authenticate a subsequent packet received from the first client node;

in response to authenticating the first packet, set a value in a header of the first packet, wherein the value indicates that the first packet is authenticated in the service topology layer; and a third set of instructions, executable on the computer system, configured to forward the first packet to a first service node in the service topology layer, wherein the first service node is configured to perform a first service function, and the first service node uses the value in the header to authenticate the first packet prior to performing the first service function.

15. The non-transitory computer-readable storage medium of claim 14, wherein the plurality of program instructions further comprise:

a fourth set of instructions, executable on the computer system, configured to establish a session related to the first client node, wherein the session comprises information about the first client node.

16. The non-transitory computer-readable storage medium of claim 15, wherein the second set of instructions is further configured to:

determine whether a session has been established in the service topology layer for the first client node.

17. The non-transitory computer-readable storage medium of claim 16, wherein the second set of instructions is further configured to:

in response to determining that the session has been established for the first client node, authenticate the first packet based, at least in part, on the information stored in the cache.

18. The non-transitory computer-readable storage medium of claim 14, wherein the first set of instructions is further configured to:

in response to forwarding the first packet to the authentication node, receive an indication from the authentication node.

* * * * *